United States Patent Office 2,851,500
Patented Sept. 9, 1958

2,851,500

USE OF SPIROCHROMANS FOR THE SEPARATION OF RELATIVELY STRAIGHT-CHAIN ALIPHATIC HYDROCARBONS FROM HYDROCARBON MIXTURES

Edward M. Geiser, Downers Grove, Ill., assignor to Universal Oil Products Company, Des Plaines, Ill., a corporation of Delaware No Drawing. Application October 4, 1956
Serial No. 613,807

16 Claims. (Cl. 260—666)

This invention relates to a process for separating hydrocarbon mixtures in the presence of a novel class of separating agents, herein referred to generally as the spirochromans, to thereby segregate by virtue of the separation process one or more components of the hydrocarbon mixture having relatively straight-chain structure. More specifically, the invention concerns a separation process wherein a hydrocarbon mixture containing aliphatic components of relatively straight-chain structure and the branched-chain or cyclic isomers or homologs thereof is contacted with a special class of compounds containing a spirochroman nucleus having polar radicals substituted in nuclear positions on the spirochroman ring, as well as hydrocarbon radicals in certain designated nuclear positions.

One object of this invention is to separate hydrocarbon mixtures comprising relatively straight-chain aliphatic hydrocarbons in admixture with other hydrocarbon types of branched-chain or cyclic structure under conditions whereby separate fractions of the foregoing indicated classes are segregated. In specific applications of the process an objective of the method may be to recover normal or straight-chain paraffin hydrocarbons from gasoline boiling range fractions in order to enhance the qualities of the non-extracted portion for gasoline use and more specifically for the production of high octane motor fuel fractions. In other specific applications, the process may be desirably operated to separate normal paraffins or olefins from aromatic hydrocarbons or from branched-chain aliphatic hydrocarbons.

In one of its embodiments the present invention concerns a process for separating an aliphatic hydrocarbon of relatively lesser branched-chain structure than other components of a mixture of hydrocarbons from said other hydrocarbon components which comprises introducing into said mixture a spirochroman compound characterized in having polar radicals substituted on the spirochroman nucleus in the 6,6'-positions and in having an alkyl radical containing at least 4 carbon atoms substituted on the nucleus in the 4,4'-positions and thereafter separating from the resulting spirochroman-hydrocarbon mixture a fraction enriched with respect to said other hydrocarbon components.

A specific embodiment of the invention concerns a method for separating normal paraffins containing from 5 to 12 carbon atoms per molecule from isomeric branched-chain paraffins and cyclic hydrocarbons which comprises subjecting said mixture to extractive distillation in the presence of a spirochroman compound containing hydroxyl groups in the 6,6' and 7,7'-positions, an alkyl radical, R, containing from 5 to 12 carbon atoms in the 4,4'-position and an alkyl radical containing R–1 carbon atoms in the 3-position, and recovering from said mixture an overhead fraction containing branched-chain and cyclic hydrocarbons in a proportion greater than the proportion of said branched-chain and cyclic hydrocarbon in said mixture.

In its essential aspects the process of this invention provides a means for separating mixtures of hydrocarbons differing in structure, and is particularly directed to a method for effecting the separation between aliphatic hydrocarbons having relatively small molecular diameters from hydrocarbons of greater molecular size, irrespective of their relative molecular weights. Thus, hydrocarbons with little or no branching in the structure of the molecule, such as the normal aliphatic paraffins and olefins, when arranged in space have relatively small diameters, even though the length of the chain may be substantial; these hydrocarbons, therefore, when considered on the basis of a two-dimensional projection thereof, are relatively "thin" molecules compared to their hydrocarbon isomers and analogs of branched-chain or cyclic structure. Thus, of the hexanes, the normal isomer is a relatively narrow molecule, whereas isohexane or cyclohexane is a relatively wider molecule because of the spacial relationships of the carbon atoms in the structure of these hydrocarbons. The effectiveness of the present separating agents is believed to rely on the above space-occupancy factors in its selective property of retaining within the structure of the spirochroman compound the normal or relatively non-branched-chain aliphatic hydrocarbons contacted therewith as distinguished from the selective rejection of isoparaffin and iso-olefin hydrocarbons of aliphatic or cyclic structure. It is not intended, however, that the scope of the present invention be necessarily limited to such factors as an explanation of the selectivity of the present separating agent.

The present separating agents which may be utilized in adsorption-type separation procedures or as an additive to hydrocarbon mixtures for the purposes of depressing the vapor pressure of the normal or relatively straight-chain hydrocarbon components of a mixture containing the same are members of a class of compounds referred to as "spirochromans" having a specific composition corresponding, in general, to the following structural formula:

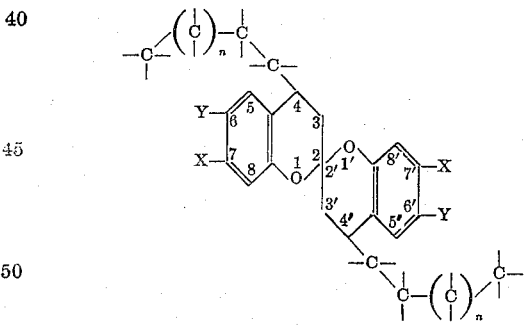

The present separating agents are effective in a contact type of separation process by virtue of what is believed to involve certain radicals in the structure of the separating agent; that is, the alkyl chain in the 4 and 4' positions must contain at least 4 carbon atoms (n must be equal to at least one) and the compound must contain a polar radical in the 6 and 6' positions and, alternatively, a polar group, X, in the 7,7' positions, in addition to having the polycyclic spirochroman nucleus. According to the proposed theory of its effectiveness in accomplishing the present separation of relatively straight-chain aliphatic hydrocarbons from the corresponding branched-chain or cyclic isomers, homologs, or analogs, it is believed that when the alkyl substituent in the 4 and 4' positions contains at least 4 carbon atoms, the free end of the alkyl group is attracted by the polar radical in the 6 and 6' positions to form a more or less closed ring into which the relatively straight-chain hydrocarbon component of the feed mixture is permitted to enter but which, because of its size restrictions does not permit the relatively branched-chain or cyclic hydrocarbon components of the feed stock mixture (which have relatively greater molecular diameters) to enter. The spirochroman containing the indicated nuclear substituents in its structure acts somewhat in the capacity of a molecular sieve, except that the relatively straight-chain aliphatic hydrocarbons are believed to be retained within the structure of the spirochroman through adsorptive or complex-forming forces, while the hydrocarbon components of the mixture having a branched-chain or cyclic structure pass through or around the spirochroman unabsorbed thereby. The net result of contacting the present spirochroman separating agent with a hydrocarbon mixture comprising relatively straight-chain and branched-chain or cyclic hydrocarbons is the retention by the separating agent of the relatively straight-chain aliphatic hydrocarbons, while in a distillation type of separation, the spirochroman tends to decrease the relative volatility of the straight-chain components while permitting the branched-chain and cyclic hydrocarbons to boil at their normal boiling points. The overhead from such a distillation, therefore, is enriched with respect to the branched-chain and cyclic components of the feed mixture, while the still residue is enriched with the straight-chain or relatively unbranched-chain aliphatic components of the feed stock.

Although the preferred compounds of the above structure contain an alkyl group in the 4 and 4' positions of straight-chain configuration, branched-chain radicals may also be substituted in this position to provide separating agents of substantial effectiveness. Of the straight-chain alkyl radicals, the $C_5$, $C_6$ and $C_7$ alkyl groups are further preferred and provide separating agents having the maximum degree of effectiveness. The 4 and 4' positions as well as the 3-position may also be additionally substituted by alkyl radicals and in the preferred embodiment of the invention, the 4 and 4' positions each contain an additional methyl radical while the 3-position contains an alkyl group having one less carbon atom than the long chain alkyl group in the 4 and 4' positions. Although for practical reasons involved in their preparation, it is generally preferred that the alkyl radicals in the 4 and 4' positions be selected from those containing not more than about 12 carbon atoms, the alkyl groups in these positions are not necessarily limited to such radicals containing a maximum of 12 carbon atoms, no advantage, however, being realized in the use of separating agents in which the alkyl group is of longer chain than dodecyl.

The polar radical substituted in the 6 and 6' positions on the spirochroman nucleus may be selected from one or more of a relatively large number of monovalent radicals having polar characteristics, including, for example, hydroxyl, carboxyl, cyano, nitro, amino, sulfo, sulfhydryl, etc., one of the preferred polar radicals for this purpose being hydroxyl. Compounds of this character which contain an additional polar radical substituted in the 7 and 7' positions, such as an hydroxyl group, in addition, that is, to the polar radical substituted in the 6 and 6' positions on the spirochroman nucleus, exhibit substantially greater effectiveness as separating agents than compounds in which the 7 and 7' positions are not thus substituted.

Suitable hydrocarbon feed stock mixtures utilizable in the present separation process include any hydrocarbon mixture containing from small amounts to large amounts of normal or relatively straight-chain aliphatic hydrocarbons, the remaining components of the mixture being any one or more members of the group comprising the aliphatic hydrocarbons of greater branched-chain structure than the component to be separated, the naphthene hydrocarbons and the aromatic hydrocarbons of mono- or bicyclic ring structure. A particularly useful application of the process is for the treatment of gasoline boiling range fractions to increase the octane number of the fraction by removing the relatively straight-chain or normal aliphatic hydrocarbons which have the lowest octane ratings of the various types of hydrocarbons and reduce the octane rating of gasoline boiling range fractions in which they occur. Thus, by subjecting a mixture of hydrocarbons boiling in the gasoline range to treatment with the present separating agent, the effluent from the process contains a relatively greater proportion of higher octane rated hydrocarbons than the feed stock mixture because of the selected removal of the normal or relatively straight-chain aliphatic components from the feed stock mixture. The hydrocarbons removed from the gasoline fraction by the separating agent may be separately recovered and subjected to a refining process, such as an isomerization or a reforming process to convert the relatively straight-chain hydrocarbons thus recovered into branched-chain or cyclic isomers of higher octane number. The process is generally applicable to hydrocarbon fractions containing components having up to about 12 carbon atoms per molecule and will selectively separate hydrocarbons within the range of from $C_4$ to $C_{12}$ carbon atom content.

In the application of the process to a separation problem for recovering or removing normal or relatively straight-chain aliphatic components from a mixture of hydrocarbons, the feed stock may be passed through or mixed with the separating agent in liquid phase, or the separating agent may be added to a distillation column in which the feed stock mixture is being fractionated in an extractive distillation type of operation. In a convenient method of operating a contacting type of separation process, the separating agent which comprises the present spirochroman derivative may be merely mixed with the hydrocarbon mixture in liquid phase and thereafter filtered to recover the separating agent containing absorbed or occluded normal or straight-chain aliphatic hydrocarbon. Since the spirochroman separating agent is substantially insoluble in the hydrocarbon feed stock mixture, another means of operating such a separation process comprises passing the hydrocarbon feed stock mixture through a column packed with discrete particles of the spirochroman derivative until the latter has adsorbed sufficient normal or straight-chain aliphatic hydrocarbon to substantially saturate the capacity of the spirochroman to adsorb aditional hydrocarbon. In this type of separation, the spirochroman separating agent may also be composited with or deposited on a suitable solid supporting material, such as charcoal, sand, quartz chips, Berl saddles, or other solid material insoluble in the hydrocarbon stream. In such a chromatographic adsorption type of separation, the feed stock is preferably contacted with the solid spirochroman under countercurrent flow conditions, the feed stock mixture being charged into either the upper or lower portion of a column packed with the spirochroman to provide either downflow or upflow conditions, respectively. The adsorption type of contacting procedure may furthermore be effected under liquid-solid phase conditions or gas-solid phase conditions, depending upon the temperature of the feed stock and the ambient pressure. In either method of contact, the temperature of operation must be such that the spirochroman separating agent is maintained in substantially solid phase during the period of contact; that is, at temperatures below the melting point of the normally solid spirochroman. In the gas-solid phase type of separation, the feed mixture in gaseous phase may be introduced into the separating column while the spirochroman is maintained as a stationary, packed, bed (the so-called "fixed bed" technique) or the velocity of the gas phase may be sufficient to continuously suspend the solid spirochroman in the gases (the so-called "fluidized bed" technique).

One of the preferred methods of separation utilizing the present spirochroman compounds comprises mixing the spirochroman with the hydrocarbon feed stock and subjecting the resulting mixture to extractive distillation under conditions whereby the non-adsorbed components of the feed stock, the boiling points of which are unaffected by the presence of the spirochroman, are distilled overhead from the resulting mixture, while the normal or relatively straight-chain aliphatic components of the feed stock are retained in the still incombined relationship with the spirochroman separating agent. Still another method of separation which effectively employs the present spirochroman compounds as the separating agent comprises mixing the hydrocarbon feed stock with an aqueous slurry of the spirochroman in finely divided condition and thereafter allowing the resulting phase separation to take place, the normal or relatively straight-chain components of the feed stock entering into combination with the spirochroman component of the slurry, while the relatively branched-chain or cyclic hydrocarbon components of the feed stock form a separate phase which may be decanted or centrifuged from the spirochroman slurry. Instead of water as the suspending medium, a hydrocarbon having a boiling point above or below the feed stock mixture may be utilized to provide the suspending medium, the unadsorbed branched-chain or cyclic hydrocarbon components of the feed stock thereby mixing with the excess of suspending medium to form a raffinate phase which may be distilled or otherwise treated to separate the suspending medium from the unadsorbed components of the feed stock mixture. The preferred hydrocarbons for this purpose are the cyclic and branched-chain hydrocarbons of lower molecular weight than the hydrocarbon components of the feed stock, such as isobutane, isopentane, 2,3-dimethyl butane, a cyclohexane, or other lower molecular weight hydrocarbon of the class not adsorbed by the present separating agent.

The spirochroman-hydrocarbon combination formed by adsorption of the normal or relatively straight-chain hydrocarbon component of the feed stock during the separation process may be individually treated following the separation process in order to recover the adsorbed hydrocarbon, if desired. For this purpose, the spirochroman-combined hydrocarbon solid may be heated above the boiling point of the adsorbed hydrocarbon to distill vapors of the latter hydrocarbons overhead, preferably under reduced pressure in order to increase the quantity and the rate recovery of the adsorbed hydrocarbon. Another suitable method for recovering the adsorbed hydrocarbon comprises washing the spirochroman-hydrocarbon-combination or adduct with an excess of a liquid or gaseous hydrocarbon displacing agent containing relatively straight-chain components which are preferentially adsorbed by the spirochroman and thereafter distilling the resulting hydrocarbon effluent to recover the wash hydrocarbon separate from the resulting desorbed hydrocarbon. For this purpose, it is generally preferred to utilize a hydocarbon washing or displacing agent which boils above or below the boiling point of the adsorbed hydrocarbon, such as n-pentane, n-hexane or other relatively straight-chain hydrocarbon, in order to facilitate separation of the desorbed hydrocarbon from the excess displacing hydrocarbon in the wash effluent. The washing operation is preferably conducted under countercurrent flow conditions in order to increase the extent and completeness of recovery. The spent adsorbent may generally be readily regenerated by heating, steaming, or by other methods for restoring the adsorbency of the spirochroman.

The process of separation herein provided is preferably effected at temperatures below the melting point of the spirochroman adsorbent, preferably at temperatures below about 120° C. and at pressures sufficient to maintain the hydrocarbon feed stock mixture in substantially liquid phase. The ratio of spirochroman adsorbent to hydrocarbon feed stock mixture supplied to the separation zone is preferably sufficient to provide at least 0.1 mol of spirochroman per mol of the relatively straight-chain aliphatic hydrocarbon component in the feed stock mixture to be separated; that is, a molar ratio of spirochroman to the normal or relatively straight-chain hydrocarbon component of the feed stock of at least 0.1 to 1 and preferably from about 0.5 to 1 to about 5 to 1 mols per mol.

The present separation process may be effected in a batch-type procedure or on a continuous basis as long as the above molar ratios of spirochroman to straight-chain or relatively nonbranched-chain hydrocarbon component in the feed stock are maintained. Thus, in a typical batch-type operation the spirochroman and feed stock mixture are charged into a suitable stirring device, the resulting mixture stirred or otherwise agitated for a period of from about ½ to about 2 hours and thereafter the spirochroman, in combination with the adsorbed hydrocarbon, is recovered by centrifuging, filtration, or by other means of separation. In a typical continuous type operation, the feed stock mixture and spirochroman adsorbent are continuously charged into a vessel, the spirochroman preferably being introduced into one end of the vessel while the raffinate or stream of unadsorbed components of the feed stock mixture is being withdrawn from the same end of the vessel that receives the spirochroman and while the combined spirochroman-adsorbed hydrocarbon combination is withdrawn from the same end of the vessel that receives the feed stock mixture. A preferred type of vessel for this purpose is a vertical column which is relatively elongated compared to the width or diameter of the column, thereby providing a true countercurrent flow arrangement.

The present invention is further illustrated with respect to several of its embodiments in the following examples which, however, are presented merely for illustrative purposes and not by way of limitation.

EXAMPLE I

A mixture of 50.8 parts of normal heptane and 49.2 parts by weight of iso-octane was charged into a distillation flask, together with 60 weight percent of the combined mixture of 6,6', 7,7'-tetrahydroxy-4,4'-di-methyl-4,4'-di-n-hexyl-3-n-amyl-bis-2,2'-spirochroman, having a melting point of 119–120° C. The mixture was thereafter distilled and an overhead fraction, amounting to 10% by weight of the hydrocarbons charged was collected. Infra-red analysis of the condensed overhead fraction indicated that it contains 39.8% n-heptane and, 60.2% iso-octane.

EXAMPLE II

In the following example, a chromatographic adsorption type of separation procedure was utilized to determine the effectiveness of 6,6', 7,7'-tetrahydroxy-4,4'-di-methyl-4,4'-di-n-hexyl-3-n-amyl-bis-2,2'-spirochroman as a separating agent in a countercurrent adsorption type of operation. A glass tube 10 inches long by 7 mm. inside diameter was packed to a length of 8½ inches with a crystalline, solid adsorbent comprising the above spirochroman. A hydrocarbon mixture consisting of 49.2 parts by weight of iso-octane and 50.8 parts by weight of n-heptane was charged into the top of the column dropwise and a fraction of unadsorbed hydrocarbon collected from the bottom of the column. The test was run at a temperature of approximately 24° C. The effluent hydrocarbon stream was analyzed by infra-red spectroscopy to determine the ratio of iso-octane to n-heptane in the effluent. The first 0 to 10% by weight of hydrocarbon charge collected in the effluent receiver contained 75 parts by weight of iso-octane and 25 parts by weight of n-heptane. The next effluent fraction, comprising 10 to 20% by weight of the hydrocarbon charge contained 59.1% iso-octane and 40.9% by weight of n-heptane, indicating substantial adsorption of the n-heptane component by the spirochroman adsorbent.

EXAMPLE III

In the following run a chromatographic type of adsorption was effected in a 30-inch column of adsorbent surrounded with a glass tube through which air, at a temperature of 55° C. was circulated to heat the internal adsorption tube of the column. The spirochroman derivative utilized in Examples I and II above was employed as the adsorbent in the present run and a mixture of 49.2 weight percent iso-octane and 50.8 weight percent of n-heptane was utilized as the feed stock. 45% of the hydrocarbon charged was removed in 3 fractions as effluent from the bottom of the column. The first 9.4% of the charge recovered as affluent contained 62.4% iso-octane and 37.6% n-heptane. The second 9.4% of the charge removed as an effluent fraction contained 55.3% by weight of iso-octane and 44.7% by weight of n-heptane. The third fraction, representing 25.9% by weight of the charge, contained 51.8% by weight of iso-octane and 48.2% by weight of n-heptane. The temperature of the air circulated through the jacket was then increased to 70° C. and the pressure on the adsorption column reduced to 200 mm. Hg abs. The total hydrocarbon recovery by condensing the overhead vapors from the adsorption column was 99%.

In a second run utilizing a 11.5 inch by 10 mm. I. D. glass adsorption column packed with 7.8 grams of spirochroman and utilizing a charge stock consisting of 50 weight percent each of iso-octane and n-heptane, the first effluent fraction, consisting of 9.2 weight percent of the hydrocarbon charge, contained 82 weight percent iso-octane and 18 weight percent n-heptane. The second effluent fraction comprising 9.2 weight percent of the charge contained 58.0% iso-octane and 42.0% n-heptane. The column was then washed with n-pentane and the pentane flashed off from the effluent washings. The recovered hydrocarbon contained 40.0 weight percent iso-octane and 56.0 weight percent n-heptane. The column was then dried and additional feed mixture containing the 50–50 weight percent ratio of iso-octane and n-heptane was charged into the column. The first effluent fraction consisting of 9.7 weight percent of the charge contained 66.0 weight percent iso-octane and 34.0 weight percent n-heptane. The second effluent fraction comprising 9.7 weight percent of the hydrocarbon feed contained 58.0 weight percent iso-octane and 42.0 weight percent n-heptane. The above results indicate that a spirochroman adsorbent may be regenerated by countercurrently washing the spent adsorbent with a light hydrocarbon wash stream, followed by drying the adsorbent.

EXAMPLE IV

In the following run the spirochroman adsorbent specified in Examples I and II above was packed into a glass adsorption column 10 inches long by 7 mm. I. D. Two mixtures of various normal and iso-paraffins were charged into the top of the column and fractions were recovered as effluent from the bottom of the column. The following Table I indicates the hydrocarbon mixtures utilized and the degree of separation obtained.

*Table I*

CHROMATOGRAPHIC ADSORPTION OF HYDROCARBONS FROM 50–50 WEIGHT PERCENT MIXTURES

| Hydrocarbon Charge | First Fraction | Second Fraction |
|---|---|---|
| n-pentane | 34.4 | |
| iso-pentane | 58.0 | |
| n-hexane | 43.0 | 48.6 |
| 2-methylpentane | 57.0 | 51.4 |
| n-hexane | 39.5 | 49.2 |
| 3-methylpentane | 60.5 | 50.8 |
| n-hexane | 40.5 | 46.2 |
| 2,2-di-methylbutane | 59.5 | 53.8 |
| n-hexane | 46.0 | 47.0 |
| cyclohexane | 34.0 | 53.0 |
| 3-methylpentane | 46.0 | 48.5 |
| 2,3-di-methylbutane | 54.5 | 51.5 |
| n-heptane | 42.7 | 46.4 |
| methylcyclohexane | 57.3 | 53.6 |

These results indicate that the present separating agents are effective for separating hydrocarbons of lesser degree of branching from hydrocarbon mixtures containing branched-chain aliphatic or cyclic hydrocarbons.

EXAMPLE V

In the following run a method of separation utilizing an aqueous slurry of the foregoing spirochroman derivative was employed to effect the separation of n-heptane from iso-octane. 11 grams of spirochroman was shaken with 25 cc. of water to form an aqueous suspension. To this suspension was added 10 cc. of a hydrocarbon mixture consisting of equal volumes of iso-octane and n-heptane. The entire mixture was filtered and the filtrate allowed to separate into two phases from which the upper layer of hydrocarbon was decanted, dried over sodium sulfate and subjected to infra-red analysis. The hydrocarbon phase thus recovered contained 54.5% of iso-octane, 43.0% n-heptane and 2.5% of unidentified material.

EXAMPLE VI

A series of spirochroman derivatives corresponding to the following general formula:

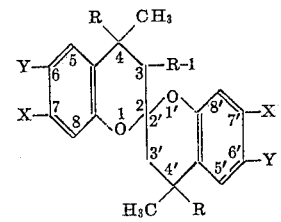

was prepared to determine the effect of various nuclear substituent groups on the separating ability of the material as an adsorbent. In each instance the separating ability of the derivative was determined by charging a 50–50 (by volume) mixture of iso-octane and n-heptane into a chromatographic type adsorption column containing the indicated derivatives as packing materials and analyzing by infra-red analysis the effluent fraction recovered from the bottom of the column. The following Table II indicates the various substituent groups introduced on the spirochroman nucleus and the degree of effectiveness of the resulting derivative in separating the foregoing hydrocarbon feed stock.

*Table II*

| Substituent | Effluent Analysis | |
|---|---|---|
| | Wt. Percent Iso-octane | Wt. Percent n-heptane |
| R=n-butyl, X and Y=hydroxyl | 51.5 | 48.5 |
| R=n-amyl, X and Y=hydroxyl | 58.4 | 41.6 |
| R=n-hexyl, X and Y=hydroxyl | 75 | 25 |
| R=n-heptyl, X and Y=hydroxyl | 63 | 37 |
| R=n-octyl, X and Y=hydroxyl | 60 | 40 |
| R=n-decyl, X and Y=hydroxyl | 58.5 | 41.5 |
| R=n-dodecyl, X and Y=hydroxyl | 52.4 | 47.6 |
| R=n-hexyl, Y=Sulfo | 65.5 | 34.4 |
| R=n-hexyl, Y=Nitro | 66 | 34 |

The above data indicate that optimum effectiveness of the spirochroman as a separating agent is realized when the R substituent is an n-hexyl radical and the "Y" substituent is hydroxyl, although each of these variables may be modified with "X" and "Y" being other polar radicals and R being other hydrocarbon groups, the resulting derivatives providing separating agents which are effective for the indicated separation.

I claim as my invention:

1. A process for separating an aliphatic hydrocarbon of relatively straight-chain structure from a hydrocarbon mixture containing the same and a hydrocarbon selected from an aliphatic hydrocarbon of relatively branched-chain structure and a cyclic hydrocarbon, said process comprising: introducing into said mixture a spirochroman compound characterized in having a polar radical substituted on the spirochroman nucleus in the 6,6'-position and having an alkyl radical containing at least 4 carton atoms substituted on the nucleus in the 4,4'-position and thereafter separating from the resulting spirochroman-hydrocarbon mixture a fraction enriched with respect to said hydrocarbon selected from the group consisting of said relatively branched-chain hydrocarbon and said cyclic hydrocarbon component of said mixture.

2. The process of claim 1 further characterized is that said hydrocarbon mixture comprises a normal aliphatic hydrocarbon and an aliphatic hydrocarbon of branched-chain structure.

3. The process of claim 1 further characterized in that said mixture comprises an aliphatic hydrocarbon and a cyclic hydrocarbon.

4. The process of claim 3 further characterized in that said cyclic hydrocarbon is a naphthene.

5. The process of claim 1 further characterized in that said alkyl substituent on the spirochroman nucleus contains from 5 to 12 carbon atoms.

6. The process of claim 5 further characterized in that said polar radical is hydroxyl.

7. The process of claim 6 further characterized in that said polar radical is sulfo.

8. The process of claim 1 further characterized in that said spirochroman contains additional polar radicals in the 7,7'-positions.

9. The process of claim 8 further characterized in that said additional polar radicals are hydroxyl groups.

10. The process of claim 1 further characterized in that said spirochroman contains an additional alkyl group consisting of the methyl radical in the 4 and 4'-positions.

11. The process of claim 10 further characterized in that said spirochroman contains in the 3-position an additional alkyl substitutent consisting of an alkyl radical having one less carton atom than the alkyl group in the 4,4'-positions.

12. A process for separating a hydrocarbon mixture comprising an aliphatic hydrocarbon of relatively straight-chain configuration from a hydrocarbon selected from the group consisting of an aliphatic hydrocarbon of relatively branched-chain structure and a cyclic hydrocarbon which comprises distilling said mixture in the presence of a spirochroman compound characterized in having a polar radical substituted on the spirochroman nucleus in the 6,6'-position and in having an alkyl radical containing at least 4 carbon atoms substituted on the nucleus in the 4,4'-position and thereafter withdrawing an overhead distillate comprising a hydrocarbon fraction enriched with respect to said hydrocarbon selected from the group consisting of aliphatic hydrocarbon of relatively branched-chain structure and said cyclic hydrocarbon.

13. A process for separating a hydrocarbon mixture comprising an aliphatic hydrocarbon of relatively straight-chain configuration from a hydrocarbon selected from the group consisting of an aliphatic hydrocarbon of relatively branched-chain structure and a cyclic hydrocarbon which comprises introducing said hydrocarbon mixture into the upper portion of a vertically elongated confined zone containing a spirochroman compound characterized in having a polar radical substituted on the spirochroman nucleus in the 6,6'-position and in having an alkyl radical containing at least 4 carbon atoms substituted on the nucleus in the 4,4'-position and thereafter recovering from the bottom of said zone a hydrocarbon fraction enriched with respect to said hydrocarbons selected from the group consisting of said aliphatic hydrocarbon of relatively branched-chain structure and said cyclic hydrocarbon.

14. A process for separating a hydrocarbon mixture comprising an aliphatic hydrocarbon of relatively straight-chain configuration from a hydrocarbon selected from the group consisting of an aliphatic hydrocarbon of relatively branched-chain structure and a cyclic hydrocarbon which comprises mixing said hydrocarbon mixture with a spirochroman compound characterized in having a polar radical substituted on the spirochroman nucleus in the 6,6'-position and in having an alkyl radical containing at least 4 carbon atoms substituted on the nucleus in the 4,4'-position and thereafter filtering the resulting spirochroman-hydrocarbon mixture and recovering as filtrate a hydrocarbon fraction enriched with respect to said hydrocarbons selected from the group consisting of said aliphatic hydrocarbon of relatively branched-chain structure and said cyclic hydrocarbon.

15. A process for separating a hydrocarbon mixture comprising an aliphatic hydrocarbon of relatively straight-chain configuration from a hydrocarbon selected from the group consisting of an aliphatic hydrocarbon of relatively branched-chain structure and a cyclic hydrocarbon which comprises mixing said hydrocarbon mixture with an aqueous suspension of a spirochroman compound characterized in having a polar radical substituted on the spirochroman nucleus in the 6,6'-position and in having an alkyl radical containing at least 4 carbon atoms substituted on the nucleus in the 4,4'-position and thereafter separating a resulting spirochroman phase from a hydrocarbon fraction enriched with respect to said hydrocarbons selected from the group consisting of said aliphatic hydrocarbon of relatively branched-chain structure and said cyclic hydrocarbon.

16. The process of claim 1 further characterized in that a spirochroman-adsorbed hydrocarbon combination is separated from non-adsorbed hydrocarbon and said combination is thereafter contacted with an excess of preferentially adsorbed hydrocarbon of relatively straight-chain structure and thereafter recovering the non-adsorbed excess from said spirochroman.

References Cited in the file of this patent

UNITED STATES PATENTS

| | | |
|---|---|---|
| 2,535,058 | Gleim | Dec. 26, 1950 |
| 2,746,871 | Thompson | May 16, 1956 |

OTHER REFERENCES

Niederl et al.: Jour. Amer. Chem. Soc., vol. 62, 1940, pp. 324–325.